US008345406B2

(12) United States Patent
Dreissig et al.

(10) Patent No.: US 8,345,406 B2
(45) Date of Patent: Jan. 1, 2013

(54) ELECTRIC DOUBLE LAYER CAPACITOR

(75) Inventors: Dirk H. Dreissig, Myrtle Beach, SC (US); Jonathan R. Knopsnyder, Myrtle Beach, SC (US); Jessica M. Smith, Myrtle Beach, SC (US); Lee Shinaberger, Myrtle Beach, SC (US); Bharat Rawal, Surfside Beach, SC (US)

(73) Assignee: AVX Corporation, Myrtle Beach, SC (US)

( * ) Notice: Subject to any disclaimer, the term of this patent is extended or adjusted under 35 U.S.C. 154(b) by 505 days.

(21) Appl. No.: 12/408,832

(22) Filed: Mar. 23, 2009

(65) Prior Publication Data
US 2010/0238606 A1    Sep. 23, 2010

(51) Int. Cl.
*H01G 9/038*    (2006.01)
*H01G 9/035*    (2006.01)
*H01G 9/022*    (2006.01)

(52) U.S. Cl. ........ 361/504; 361/502; 361/503; 361/523; 361/528; 361/532; 252/62.2

(58) Field of Classification Search .................. 361/523, 361/532, 528, 502, 503, 504; 29/25.03; 252/62.2
See application file for complete search history.

(56) References Cited

U.S. PATENT DOCUMENTS

| | | | | |
|---|---|---|---|---|
| 3,293,507 A | * | 12/1966 | Smith | 361/518 |
| 3,331,993 A | * | 7/1967 | Brown et al. | 361/511 |
| 3,466,508 A | * | 9/1969 | Booe | 361/536 |
| 3,828,227 A | * | 8/1974 | Millard et al. | 361/540 |
| 3,970,903 A | * | 7/1976 | Shirn | 361/533 |
| 4,090,288 A | * | 5/1978 | Thompson et al. | 29/25.03 |
| 4,203,194 A | * | 5/1980 | McGrath | 29/25.03 |
| 4,571,664 A | * | 2/1986 | Hyland | 361/540 |
| 4,660,127 A | * | 4/1987 | Gunter | 361/540 |
| 5,410,445 A | * | 4/1995 | Kanetake | 361/539 |
| 5,726,118 A | * | 3/1998 | Ivey et al. | 502/417 |
| 5,858,911 A | * | 1/1999 | Wellen et al. | 502/437 |
| 6,238,444 B1 | * | 5/2001 | Cadwallader | 29/25.03 |

(Continued)

FOREIGN PATENT DOCUMENTS
EP    1863044 A1  *  12/2007
(Continued)

OTHER PUBLICATIONS
Search Report for GB0920675.6 dated Mar. 23, 2010, 3 pages.

*Primary Examiner* — Anatoly Vortman
(74) *Attorney, Agent, or Firm* — Dority & Manning, P.A.

(57) ABSTRACT

An electric double layer capacitor that contains at least one electrochemical cell is provided. The cell contains electrodes (e.g., two electrodes) that each contain a porous matrix of electrochemically-active particles (e.g., carbon). An aqueous-based electrolyte is disposed in contact with the porous matrix. In accordance with the present invention, the electrolyte is provided with an anionic polymer that serves as binding agent for the electrochemically active particles and thus reduces electrolyte loss, especially at higher temperatures. Because the polymer is anionic in nature, it is generally hydrophilic and thus can retain its binding properties in the presence of water. The anionic nature of the polymer also allows it to remain stable in the presence of a corrosive polyprotic acid, which is employed in the electrolyte to enhance charge density. Thus, as a result of the present invention, a capacitor may be formed that is capable of exhibiting good electrical performance (e.g., high capacitance and low ESR), even at high temperatures (e.g., 70° C. and above).

25 Claims, 2 Drawing Sheets

U.S. PATENT DOCUMENTS

| | | | |
|---|---|---|---|
| 6,576,365 B1 * | 6/2003 | Meitav et al. | 429/130 |
| 6,790,556 B1 * | 9/2004 | Meitav et al. | 429/210 |
| 6,970,345 B2 * | 11/2005 | Oh et al. | 361/540 |
| 7,443,653 B2 * | 10/2008 | Kim et al. | 361/523 |
| 7,570,480 B2 * | 8/2009 | Kim et al. | 361/540 |
| 2003/0158342 A1 * | 8/2003 | Shinozaki et al. | 525/231 |
| 2003/0218858 A1 * | 11/2003 | Kim et al. | 361/523 |
| 2004/0066607 A1 * | 4/2004 | Edson et al. | 361/528 |
| 2005/0088805 A1 * | 4/2005 | Edson et al. | 361/529 |
| 2006/0260109 A1 * | 11/2006 | Vaisman et al. | 29/25.41 |
| 2006/0262489 A1 * | 11/2006 | Vaisman et al. | 361/540 |
| 2007/0096055 A1 * | 5/2007 | Tsai et al. | 252/186.1 |
| 2007/0177333 A1 * | 8/2007 | Umemoto et al. | 361/502 |
| 2007/0279841 A1 * | 12/2007 | Kim et al. | 361/540 |
| 2008/0019081 A1 * | 1/2008 | Kim et al. | 361/535 |
| 2008/0049381 A1 * | 2/2008 | Saida et al. | 361/523 |
| 2008/0062617 A1 * | 3/2008 | Edson et al. | 361/529 |
| 2008/0080124 A1 * | 4/2008 | Kim et al. | 361/529 |
| 2009/0154065 A1 * | 6/2009 | Choi et al. | 361/523 |
| 2009/0154066 A1 * | 6/2009 | Choi et al. | 361/523 |
| 2009/0154068 A1 * | 6/2009 | Choi et al. | 361/533 |
| 2010/0142123 A1 * | 6/2010 | Smith et al. | 361/504 |

FOREIGN PATENT DOCUMENTS

JP   07094368 A * 4/1995

\* cited by examiner

US 8,345,406 B2

ELECTRIC DOUBLE LAYER CAPACITOR

BACKGROUND OF THE INVENTION

An electric double layer capacitor generally employs a pair of polarizable electrodes that contain a porous matrix formed from conductive particles (e.g., activated carbon). The porous matrix is impregnated with a liquid electrolyte, which may be aqueous in nature. Due to the effective surface area of the porous material and the small spacing between the electrodes, large capacitance values may be achieved for the resulting capacitor. Nevertheless, one problem often associated with such capacitors is that the aqueous electrolyte tends to undergo thermal expansion when exposed to high temperature environments. This may cause leakage of the electrolyte from the capacitor, which may in turn lead to reduced capacitance and increased equivalent series resistance ("ESR"). As such, a need currently exists for an improved electric double layer capacitor that can exhibit good electrical performance, even when exposed to a high temperature environment.

SUMMARY OF THE INVENTION

In accordance with one embodiment of the present invention, an electric double layer capacitor is disclosed that comprises an electrochemical cell. The electrochemical cell comprises first and second electrodes that each comprise a porous matrix of electrochemically-active particles. The cell also comprises an aqueous-based electrolyte disposed in contact with the electrochemically-active particles. The electrolyte includes an anionic polymer and a polyprotic acid. In accordance with another embodiment of the present invention, a method for forming an electrochemical cell of an electric double layer capacitor is disclosed. The method comprises placing a paste in contact with an electrode, wherein the paste includes electrochemically-active particles and an aqueous-based electrolyte, and the electrolyte includes a polyprotic acid and an anionic polymer.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figure in which.

Figure 1:
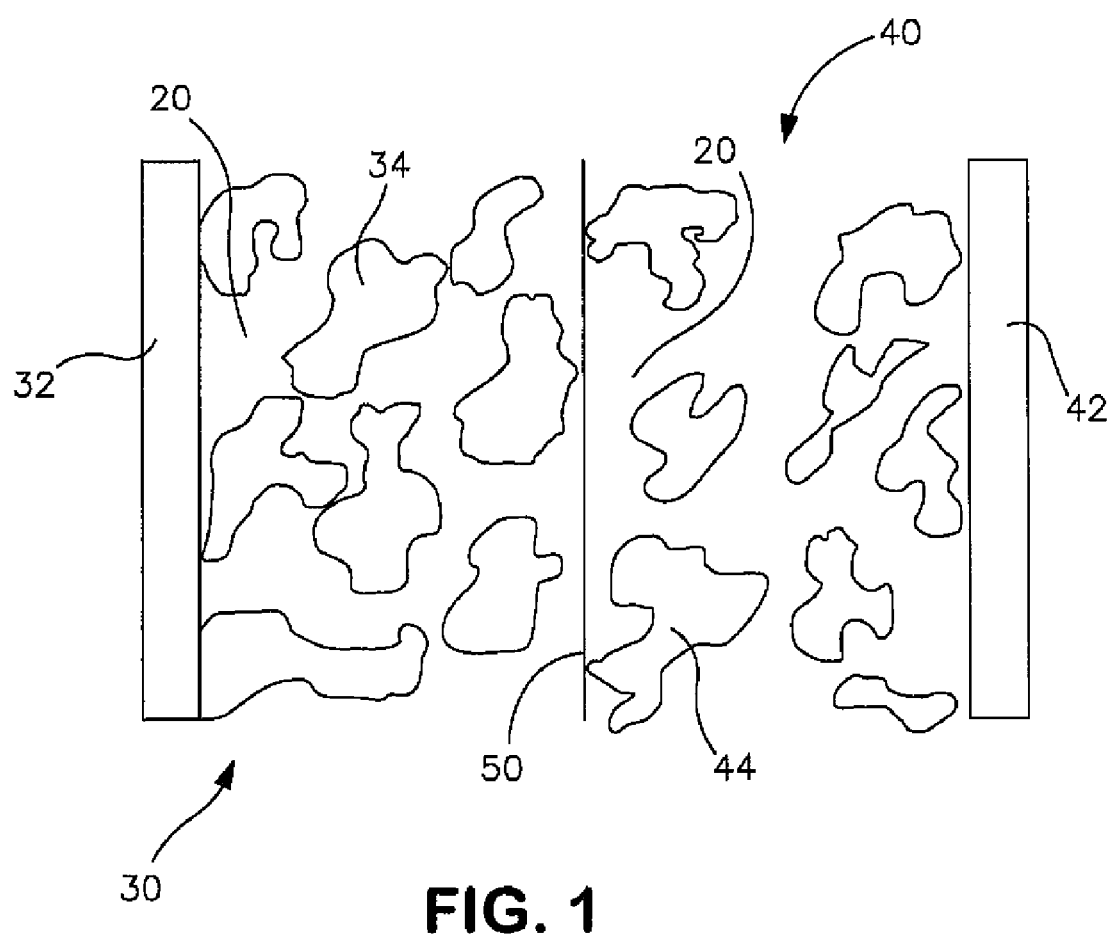
FIG. 1 is a cross-sectional view of one embodiment of a capacitor formed according to the present invention.

Repeat use of reference characters in the present specification and drawing is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed an electric double layer capacitor that contains at least one electrochemical cell. The cell contains electrodes (e.g., two electrodes) that each contain a porous matrix of electrochemically-active particles (e.g., carbon). An aqueous-based electrolyte is disposed in contact with the porous matrix. In accordance with the present invention, the electrolyte is provided with an anionic polymer that serves as binding agent for the electrochemically active particles and thus reduces electrolyte loss, especially at higher temperatures. Because the polymer is anionic in nature, it is generally hydrophilic and thus can retain its binding properties in the presence of water. The anionic nature of the polymer also allows it to remain stable in the presence of a corrosive polyprotic acid, which is employed in the electrolyte to enhance charge density. Thus, as a result of the present invention, a capacitor may be formed that is capable of exhibiting good electrical performance (e.g., high capacitance and low ESR), even at high temperatures (e.g., 70° C. and above).

The anionic polymer used in the aqueous electrolyte typically contains one or more anionic functional groups, which may be pendant from and/or contained within the polymer backbone. Suitable anionic groups may include, for instance, carboxylate, sulfonate, sulphate, and/or any other negatively charged ionizable groups. The polymer backbone may be formed from a variety of different monomers, such as aromatic monomers, aliphatic monomers, and combinations thereof. Particularly suitable monomers for use in forming the anionic polymer are vinyl aromatic monomers, such as styrene, 2-vinyl naphthalene, alpha-methyl styrene, 3-methylstyrene, 4-methylstyrene, 2,4-dimethylstyrene, 2,5-dimethylstyrene, 3,5-dimethylstyrene, 2,4,6-trimethylstyrene, 4-tert-butylstyrene, 4-methoxystyrene, 4-ethoxystyrene, 2-chlorostyrene, 3-chlorostyrene, 4-chlorostyrene, 2,6-dichlorostyrene, 4-bromostyrene, 4-acetoxystyrene, 4-hydroxystyrene, 4-amino styrene, p-dimethylethoxy siloxy styrene, 2-vinyl pyridine, 4-vinyl pyridine, vinyl benzoate, vinyl 4-tert-butyl benzoate, vinyl carbazole, vinyl ferrocene, etc. Specific examples of such anionic polymers include sulfonated polymers, such as poly(styrenesulfonic acid), poly(2-acrylamido-2-methyl-1-propane sulfonic acid), sulfonated poly(etheretherketone), sulfonated lignin, poly(ethylenesulfonic acid), poly(methacryloxyethylsulfonic acid), etc.; carboxylated polymers, such as poly(acrylic acid), poly(methacrylic acid), etc.; sulfated polymers, such as carrageenan, etc; salts of any of the foregoing polymers, as well as combinations thereof. Salts of such polymers may, for example, contain a metal cation, such as sodium, potassium, calcium, lithium, cesium, zinc, copper, iron, aluminum, zirconium, lanthanum, yttrium, magnesium, strontium, cerium, etc. Examples of such salts may include, for instance, sodium or lithium salts of poly(styrenesulfonic acid).

As indicated above, the aqueous electrolyte also includes a polyprotic acid, which is capable of undergoing two or more proton dissociations (e.g., two, three, etc.). Some examples of suitable polyprotic acids that may be employed include, for instance, hydrogen sulfide (diprotic), sulfuric acid (diprotic), sulfurous acid (diprotic), phosophoric acid (triprotic), oxalic acid (diprotic), carbonic acid (diprotic), malonic acid (diprotic), etc. Sulfuric acid ($H_2SO_4$) may, for instance, donate one proton to form a bisulfate anion ($HSO_4^-$) and a second proton to form a sulfate anion ($SO_4^{2-}$). Of course, the electrolyte may also contain monoprotic acidic compounds, such as nitric acid, nitrous acid, hydrochloric acid, perchloric acid, hydroiodic acid, hydrofluoric acid, etc.

The relative concentration of the components of the electrolyte is generally selected to achieve a balance of electrical properties for the capacitor. For instance, although high anionic polymer concentrations may enhance the stability of the electrolyte when exposed to high temperatures, too high of a concentration may adversely affect the conductivity of the electrolyte and the resulting capacitance value for the capacitor. In this regard, the present inventors have discovered that a weight ratio of polyprotic acid(s) to anionic polymer(s) of from about 2:1 to about 40:1, in some embodiments from about 5:1 to about 30:1, and in some embodiments, from about 10:1 to about 20:1 may be employed to achieve the desired electrical performance. For example, anionic polymer(s) may constitute from about 0.05 wt. % to about 15 wt. %, in some embodiments from about 0.1 wt. % to about 10 wt. %, and in some embodiments, from about 0.5 wt. % to about 5 wt. %, based on the weight of the electrolyte. Polyprotic acid(s) may likewise constitute from about 10 wt. % to about 70 wt. %, in some embodiments from about 20 wt. % to about 60 wt. %, and in some embodiments, from about 25 wt. % to about 50 wt. %, based on the weight of the electrolyte.

The aqueous electrolyte may generally possess any of a variety of forms, such as a solution, dispersion, gel, etc. Regardless of its form, however, the aqueous electrolyte typically contains water (e.g., deionized water) in an amount of from about 30 wt. % to about 90 wt. %, in some embodiments from about 40 wt. % to about 80 wt. %, and in some embodiments, from about 50 wt. % to about 70 wt. %, based on the weight of the components of the electrolyte (e.g., anionic polymer, polyprotic acid, and water). The resulting aqueous electrolyte may have an electrical conductivity of about 10 or more milliSiemens per centimeter ("mS/cm"), in some embodiments about 30 mS/cm or more, and in some embodiments, from about 40 mS/cm to about 100 mS/cm, determined at a temperature of 25° C. The value of electric conductivity may obtained by using any known electric conductivity meter (e.g., Oakton Con Series 11) at a temperature of 25° C.

The electrochemically active particles used in the electrodes of the capacitor are configured to increase the effective surface area of the electrode. Such an increased effective surface area allows for the formation of capacitors with increased cell capacitance for a given size and/or capacitors with a reduced size for a given capacitance. Typically, the electrochemically-active particles have a specific surface area of at least about 200 m$^2$/g, in some embodiments at least about 500 m$^2$/g, and in some embodiments, at least about 1500 m$^2$/g. To achieve the desired surface area, the electrochemically-active particles generally have a small size. For example, the median size of the electrochemically-active particles may be less than about 100 micrometers, in some embodiments from about 0.01 to about 50 micrometers, and in some embodiments, from about 0.1 to about 20 micrometers. Likewise, the electrochemically-active particles may be porous. For example, the electrochemically-active particles may have pores/channels with a mean diameter of greater than about 5 angstroms, in some embodiments greater than about 20 angstroms, and in some embodiments, greater than about 50 angstroms.

Any of a variety of electrochemically-active particles may be employed in the present invention. For example, carbonaceous particles may be employed that have the desired level of conductivity, such as activated carbon, carbon black, graphite, carbon nanotubes, etc., as well as mixtures thereof. Some suitable forms of activated carbon and techniques for formation thereof are described in U.S. Pat. No. 5,726,118 to Ivey, et al.; U.S. Pat. No. 5,858,911 to Wellen, et al.; as well as U.S. Patent Application Publication No. 2003/0158342 to Shinozaki, et al., all of which are incorporated herein in their entirety by reference thereto for all purposes. Various metals may also be employed as electrochemically-active particles, such as particles formed from ruthenium, iridium, nickel, rhodium, rhenium, cobalt, tungsten, manganese, tantalum, niobium, molybdenum, lead, titanium, platinum, palladium, and osmium, as well as combinations of these metals. Non-insulating oxide particles that generate electrical current through a reversible faradaic reaction sequence may also be employed. Suitable oxides may include a metal selected from the group consisting of ruthenium, iridium, nickel, rhodium, rhenium, cobalt, tungsten, manganese, tantalum, niobium, molybdenum, aluminum, lead, titanium, platinum, palladium, and osmium, as well as combinations of these metals. Particularly suitable metal oxides for use in the present invention include ruthenium dioxide ($RuO_2$).

The electrochemically-active particles are generally disposed in contact with an electrode, which may be formed from any of a variety of different electrically conductive materials, such as tantalum, niobium, aluminum, nickel, hafnium, titanium, copper, silver, aluminum, steel (e.g., stainless), alloys thereof (e.g., electrically conductive oxides), and so forth. Titanium metals, as well as alloys thereof, are particularly suitable for use in the present invention. The geometric configuration of the electrode may generally vary as is well known to those skilled in the art, such as in the form of a container, can, foil, sheet, screen, frame, etc.

The resulting capacitor may have any desired configuration as is well known in the art. Referring to FIG. 1, for example, one embodiment of an electric double layer capacitor 10 is schematically shown that includes an aqueous-based electrolyte 20 in contact with a first electrode 32 and a second electrode 42. The first electrode 32 is coated with a porous matrix of electrochemically-active particles 34. Likewise, the second electrode 42 is coated with a porous matrix of electrochemically-active particles 44. Typically, the electrodes 32 and 42 are spaced apart by a distance of from about 10 micrometers to about 1000 micrometers. In this particular embodiment, a separator 50 is also positioned between the electrodes to inhibit shorting of the charge collected on either the electrodes. The separator 50 is permeable to permit ionic current flow of the electrolyte 20. Examples of suitable materials for this purpose include, for instance, porous polymer materials (e.g., polypropylene, polyethylene, etc.), porous inorganic materials (e.g., fiberglass mats, porous glass paper, etc.), ion exchange resin materials, etc. Particular examples include ionic perfluoronated sulfonic acid polymer membranes (e.g., Nafion™ from the DuPont), sulphonated fluorocarbon polymer membranes, polybenzimidazole (PBI) membranes, and polyetherether ketone (PEEK) membranes.

The particular manner in which the electric double layer capacitor is formed may also vary as is well known in the art. In one embodiment, for example, the aqueous electrolyte is initially mixed with the electrochemically-active particles to form a paste. The solids content of the paste is typically from about 5 wt. % to about 55 wt. %, in some embodiments from about 10 wt. % to about 50 wt. %, and in some embodiments, from about 15 wt. % to about 40 wt. %. For example, the electrochemically-active particles (e.g., carbon black, graphite, etc.) typically constitute from about 5 wt. % to about 50 wt. %, in some embodiments from about 10 wt. % to about 40 wt. %, and in some embodiments, from about 15 wt. % to about 30 wt. % of the paste. The aqueous electrolyte may also constitute from about 50 wt. % to about 95 wt. %, in some embodiments from about 60 wt. % to about 90 wt. %, and in some embodiments, from about 70 wt. % to about 85 wt. % of the paste. For instance, anionic polymers may constitute from about 0.01 wt. % to about 10 wt. %, in some embodiments from about 0.05 wt. % to about 4 wt. %, and in some embodiments, from about 0.2 wt. % to about 2 wt. % of the paste;

polyprotic acids may constitute from about 10 wt. % to about 40 wt. %, in some embodiments from about 15 wt. % to about 35 wt. %, and in some embodiments, from about 20 wt. % to about 30 wt. % of the paste; and water may constitute from about 30 wt. % to about 70 wt. %, in some embodiments from about 35 wt. % to about 65 wt. %, and in some embodiments, from about 40 wt. % to about 60 wt. % of the paste.

Figure 2:
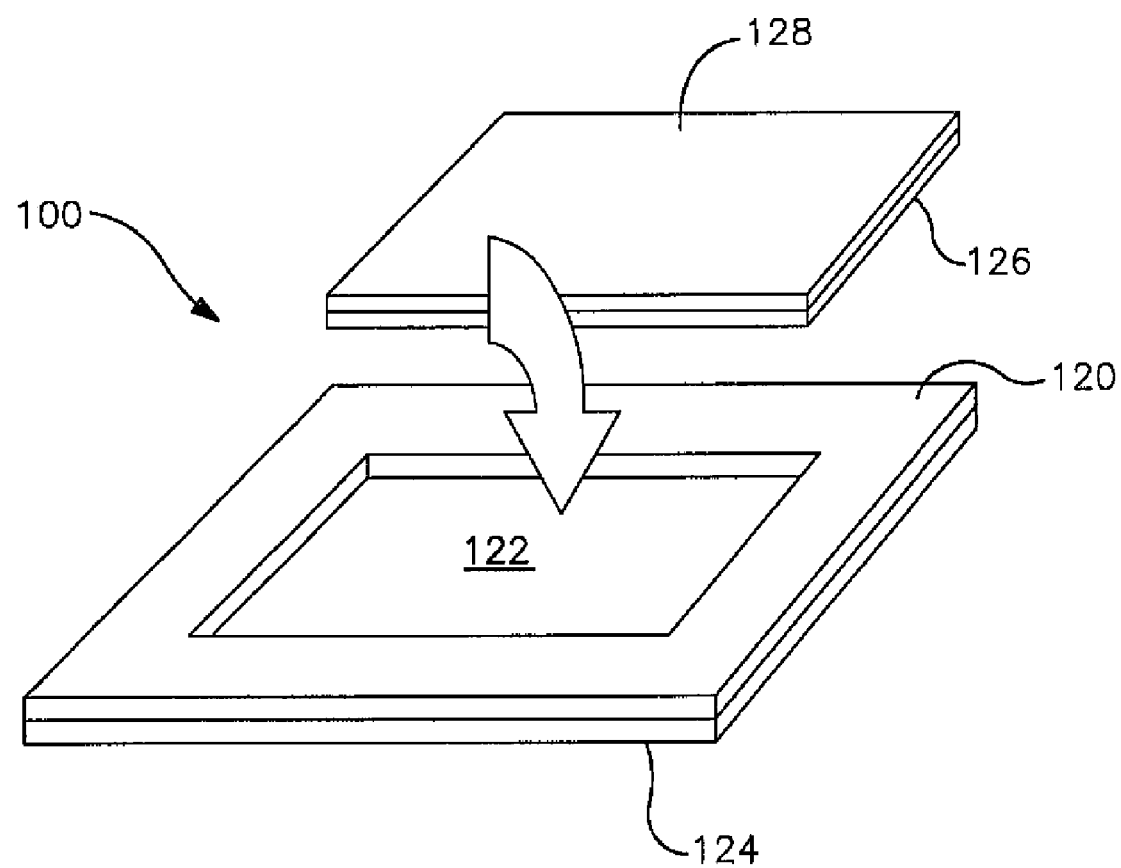
FIG. 2 is an exploded view of one embodiment of an electrochemical cell that may be employed in the capacitor of the present invention.

Once formed, the paste may then be applied to an electrode using any known technique, such as printing (e.g., rotogravure), spraying, slot-die coating, drop-coating, dip-coating, etc. Referring to FIG. 2, for example, one embodiment of a method for assembly an electrochemical cell 100 is shown. In this embodiment, a paste 126 is initially formed from a mixture of the aqueous electrolyte and electrochemically-active particles. The paste 126 and an electrode 128 are then disposed within an opening 122 of an isolating frame 120 (illustrated by the directional arrow) that is connected to another electrode 124. The frame 120 may be non-conductive and perforated in nature, such as described in U.S. Pat. No. 6,790,556 to Meitav, et al. and U.S. Pat. No. 6,576,365 to Meitav, et al., which are incorporated herein in their entirety by reference thereto for all purposes.

The embodiments described above generally refer to the use of a single electrochemical cell in the capacitor. It should of course be understood, however, that the capacitor of the present invention may also contain two or more electrochemical cells. In one such embodiment, for example, the capacitor may include a stack of two or more electrochemical cells, which may be the same or different.

Regardless of its particular configuration, the electric double layer capacitor of the present invention may exhibit excellent electrical properties even when exposed to high temperature environments. For example, the capacitor may have an equivalence series resistance ("ESR") of about 100 ohms or less, in some embodiments about 50 ohms or less, in some embodiments from about 0.01 to about 500 milliohms, in some embodiments from about 0.1 to about 100 milliohms, and in some embodiments, from about 0.1 to about 50 milliohms, measured at an operating frequency of 120 Hz. Likewise, the capacitance may be about 1 milliFarad per square centimeter ("mF/cm$^2$") or more, in some embodiments about 2 mF/cm$^2$ or more, in some embodiments from about 5 to about 50 mF/cm$^2$, and in some embodiments from about 8 to about 20 mF/cm$^2$. Such ESR and capacitance values may even be maintained even at high temperatures. For example, the values may be maintained at temperatures ranging from about 60° C. to about 80° C. (e.g., 70° C.).

Such capacitors are well suited for use in a wide variety of applications, such as in medical devices (e.g., implantable defibrillators, pacemakers, cardioverters, neural stimulators, drug administering devices, etc.); automotive applications; military applications (e.g., s RADAR systems); consumer electronics (e.g., radios, televisions, etc.); and so forth. In one embodiment, for example, the capacitor may be employed in an implantable medical device configured to provide a therapeutic high voltage (e.g., between approximately 500 Volts and approximately 850 Volts, or, desirably, between approximately 600 Volts and approximately 800 Volts) treatment for a patient. The device may contain a container or housing that is hermetically sealed and biologically inert. One or more leads are electrically coupled between the device and the patient's heart via a vein. Cardiac electrodes are provided to sense cardiac activity and/or provide a voltage to the heart. At least a portion of the leads (e.g., an end portion of the leads) may be provided adjacent or in contact with one or more of a ventricle and an atrium of the heart. The device also contains a capacitor bank that typically contains two or more capacitors connected in series and coupled to a battery that is internal or external to the device and supplies energy to the capacitor bank.

The present invention may be better understood by reference to the following examples.

Test Procedures

Equivalent Series Resistance (ESR) and Capacitance:

Equivalence series resistance was measured using an Agilent LCR meter (Model 4263B) with Kelvin or equivalent 4 point (source and sense) probe configuration. The measurement settings were: mode: Rs, time: long, and DC bias: 0V, frequency: 1000 Hz and LVL: 1000 mV. Prior to the measurement, an open and short compensation was performed that accounts for the lead length and the probe contact resistance using an internal algorithm in the Agilent LCR meter model 4263B. A resistance measurement was performed using a resistor of similar value to the rated ESR of the capacitor with a 1% tolerance. The four point probes were connected with the capacitor and the ESR was measured by triggering the LCR meter.

Capacitance was measured using a Keithley source meter (models: 2400, or 2601, or 2602). Measurement was performed by fully charging the capacitor to its rated voltage, until the charging current was below 1 mA. The part was allowed to stabilize at open circuit for 5 minutes. Discharge began at 4 mA and continued at a constant current of 4 mA. Two (2) voltage readings ($V_1$ and $V_2$) were used that were at least 1 second apart. The calculation for determining the capacitance by using the following formula: Capacitance=$|\Delta t|*I/|\Delta V|$.

EXAMPLE 1

The ability to form a conductive paste for use in the capacitor of the present invention was demonstrated. Initially, 18 grams of high surface area carbon black powder was mixed with 6 grams of graphite powder (Sigma Aldrich). Separately, 64.8 grams of 4M $H_2SO_4$ was added slowly to 7.2 grams of an aqueous solution of poly(styrene sulfonic acid) (concentration of 18 wt. %). The acidic mixture was then added to the carbon mixture and mixed thoroughly by placing the formulation onto a roller at 30 rpm. A stack of 6 single cells was formed using the resulting paste as substantially described in U.S. Pat. No. 6,790,556 to Meitav, et al. and U.S. Pat. No. 6,576,365 to Meitav, et al. Thereafter, ten (10) stacks of the cells were tested for ESR and capacitance at a temperature of 85° C. and a rated voltage of 4.5V. The results are shown below in Tables 1 and 2

TABLE 1

|  | Time (hours) | |
| --- | --- | --- |
|  | 0 | 504 |
| Capacitance (Farads) | | |
| Example 1 | 0.020 F | 0.028 F |
| Leakage Current (μA) | | |
| Example 1 | 7.2 μA | 3.8 μA |
| ESR (Ω) | | |
| Example 1 | 0.184 Ω | 0.328 Ω |

TABLE 2

|  | ESR (Ω) | ESR (Ω) | ESR (Ω) | ESR (Ω) |
|---|---|---|---|---|
| Time (hours) | 0 | 168 | 336 | 504 |
| Example 1 | 0.184 | 0.206 | 0.258 | 0.328 |

EXAMPLE 2

The ability to form a conductive paste for use in the capacitor of the present invention was demonstrated. Initially, 9.7 grams of high surface area carbon black powder was mixed with 3.3 grams of graphite powder (Sigma Aldrich). Separately, 82 grams of 4M $H_2SO_4$ was added slowly to 9.1 grams of an aqueous solution of poly(styrene sulfonic acid) (concentration of 18 wt. %). The acidic mixture was then added to the carbon mixture and mixed thoroughly by placing the formulation onto a roller at 30 rpm for 24 hours. Upon formation, sixteen (16) single cells were formed from the conductive paste that had a size of 40.5 mm×22.5 mm. One group of cells was stored at 70° C. for approximately 1340 hours (8 weeks) and another group was stored at 25° C. for approximately 1340 hours (8 weeks). The cells were tested each week for ESR and capacitance. The results for each of the 8 weeks are shown below in Tables 3 and 4.

TABLE 3

| Single Cells Stored at 70° C. | | | | | | | | | | | | | | | |
|---|---|---|---|---|---|---|---|---|---|---|---|---|---|---|---|
| ESR (1) mΩ | Cap (1) F | ESR (2) mΩ | Cap (2) F | ESR (3) mΩ | Cap (3) F | ESR (4) mΩ | Cap (4) F | ESR (5) mΩ | Cap (5) F | ESR (6) mΩ | Cap (6) F | ESR (7) mΩ | Cap (7) F | ESR (8) mΩ | Cap (8) F |
| 27 | 1.28 | 17 | 1 | 18 | 1.02 | 20 | 1.01 | 20 | 0.97 | 21.26 | 0.95 | 22.64 | 0.93 | 26.33 | 0.89 |
| 29 | 1.33 | 22 | 1.06 | 22 | 1.09 | 23 | 1.07 | 24 | 1.05 | 23.22 | 1.02 | 24.81 | 0.99 | 26.43 | 0.85 |
| 25 | 1.27 | 17 | 1 | 17 | 1.01 | 18 | 1.02 | 19 | 1 | 19.44 | 0.99 | 21.36 | 0.98 | 22.49 | 0.96 |
| 29.5 | 1.26 | 19 | 0.98 | 21 | 0.99 | 21 | 1 | 22 | 0.99 | 22.81 | 0.97 | 24.39 | 0.95 | 25.56 | 0.93 |

TABLE 4

| Single Cells Stored at 25° C. | | | | | | | | | | | | | | | |
|---|---|---|---|---|---|---|---|---|---|---|---|---|---|---|---|
| ESR (1) mΩ | Cap (1) F | ESR (2) mΩ | Cap (2) F | ESR (3) mΩ | Cap (3) F | ESR (4) mΩ | Cap (4) F | ESR (5) mΩ | Cap (5) F | ESR (6) mΩ | Cap (6) F | ESR (7) mΩ | Cap (7) F | ESR (8) mΩ | Cap (8) F |
| 27.5 | 1.32 | 20 | 1.36 | 19 | 1.28 | 18 | 1.27 | 18 | 1.34 | 17.41 | 1.31 | 17.53 | 1.33 | 17.4 | 1.27 |
| 26.5 | 1.3 | 20 | 1.31 | 18 | 1.25 | 17 | 1.24 | 17 | 1.3 | 16.42 | 1.28 | 16.25 | 1.28 | 16.01 | 1.28 |
| 27 | 1.28 | 23 | 1.31 | 20 | 1.23 | 19 | 1.23 | 18 | 1.29 | 18.07 | 1.29 | 17.96 | 1.24 | 17.73 | 1.30 |
| 30 | 1.25 | 23 | 1.25 | 22 | 1.24 | 21 | 1.2 | 21 | 1.23 | 20.36 | 1.23 | 20.45 | 1.22 | 20.03 | 1.24 |

EXAMPLE 3

The ability to form a conductive paste for use in the capacitor of the present invention was demonstrated. Initially, 30.1 grams of high surface area carbon black powder was mixed with 10 grams of graphite powder (Sigma Aldrich) and shaken for 10 seconds. Separately, 169.9 grams of 5M $H_2SO_4$ was added slowly to 19.1 grams of an aqueous solution of poly(styrene sulfonic acid) (concentration of 18 wt. %). The acidic mixture was then added to the carbon mixture and swirled with a glass rod to ensure good wetting of the carbon mixture.

EXAMPLE 4

The ability to form a conductive paste for use in the capacitor of the present invention was demonstrated. Initially, 17 grams of high surface area carbon black powder was mixed with 3 grams of graphite powder (Sigma Aldrich) and shaken for 10 seconds. Separately, 2 grams of poly(styrene sulfonic acid) sodium salt (~$M_w$ 70000) (Sigma Aldrich) was mixed with 7 grams of an aqueous solution of poly(styrene sulfonic acid) (concentration of 18 wt. %). 80 grams of 5M $H_2SO_4$ was then added to this mixture. The acidic mixture was then added to the carbon mixture and swirled with a glass rod to ensure good wetting of the carbon mixture. The resulting mixture was then placed onto a roller at 30 rpm for 24 hours. Upon formation, sixteen (16) single cells were formed from the conductive paste that had a size of 40.5 mm×22.5 mm. One group of cells was stored at 70° C. for approximately 1340 hours (8 weeks) and another group was stored at 25° C. for approximately 1340 hours (8 weeks). The cells were tested each week for ESR and capacitance. The results for each of the 8 weeks are shown below in Tables 5 and 6.

TABLE 5

Single Cells Stored at 70° C.

| ESR (1) mΩ | Cap (1) F | ESR (2) mΩ | Cap (2) F | ESR (3) mΩ | Cap (3) F | ESR (4) mΩ | Cap (4) F | ESR (5) mΩ | Cap (5) F | ESR (6) mΩ | Cap (6) F | ESR (7) mΩ | Cap (7) F | ESR (8) mΩ | Cap (8) F |
|---|---|---|---|---|---|---|---|---|---|---|---|---|---|---|---|
| 18 | 1.29 | 18 | 1.27 | 19 | 1.26 | 18.59 | 1.24 | 18.86 | 1.21 | 18.93 | 1.20 | 22.97 | 1.06 | 39.12 | 1.12 |
| 16 | 1.30 | 16 | 1.3 | 16 | 1.26 | 16.56 | 1.25 | 16.54 | 1.23 | 16.83 | 1.22 | 19.36 | 1.21 | 32.27 | 1.18 |
| 18 | 1.27 | 18 | 1.26 | 19 | 1.23 | 19.05 | 1.22 | 19.21 | 1.21 | 20.31 | 1.18 | 26.22 | 1.17 | 38.01 | 1.10 |
| 19 | 1.26 | 20 | 1.24 | 21 | 1.22 | 20.62 | 1.20 | 20.62 | 1.20 | 21.23 | 1.18 | 22.82 | 1.16 | 37.21 | 1.12 |
| Av. 17.86 | 1.28 | 18.26 | 1.27 | 18.54 | 1.24 | 18.71 | 1.23 | 18.81 | 1.21 | 19.33 | 1.20 | 22.84 | 1.15 | 36.65 | 1.13 |

TABLE 6

Single Cells Stored at 25° C.

| ESR (1) mΩ | Cap (1) F | ESR (2) mΩ | Cap (2) F | ESR (3) mΩ | Cap (3) F | ESR (4) mΩ | Cap (4) F | ESR (5) mΩ | Cap (5) F | ESR (6) mΩ | Cap (6) F | ESR (7) mΩ | Cap (7) F | ESR (8) mΩ | Cap (8) F |
|---|---|---|---|---|---|---|---|---|---|---|---|---|---|---|---|
| 18.27 | 1.49 | 18 | 1.50 | 17 | 1.5 | 16.83 | 1.49 | 17.01 | 1.50 | 16.99 | 1.50 | 16.67 | 1.55 | 16.68 | 1.54 |
| 16.93 | 1.49 | 16 | 1.52 | 16 | 1.5 | 15.51 | 1.50 | 15.17 | 1.50 | 15.15 | 1.51 | 15.13 | 1.52 | 15.19 | 1.58 |
| 18.20 | 1.54 | 17 | 1.56 | 17 | 1.56 | 16.3 | 1.56 | 16.36 | 1.58 | 16.17 | 1.57 | 16.04 | 1.59 | 16.08 | 1.59 |
| 20.23 | 1.52 | 19 | 1.50 | 19 | 1.54 | 17.4 | 1.56 | 17.55 | 1.55 | 16.98 | 1.55 | 16.8 | 1.55 | 16.8 | 1.56 |
| Av. 18.41 | 1.51 | 18 | 1.52 | 17.25 | 1.53 | 16.51 | 1.53 | 16.52 | 1.53 | 16.32 | 1.53 | 16.16 | 1.55 | 16.19 | 1.57 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. An electric double layer capacitor comprising an electrochemical cell, the cell comprising:
   first and second electrodes each comprising a porous matrix of electrochemically-active particles; and
   an aqueous-based liquid electrolyte disposed in contact with the electrochemically-active particles, wherein the electrolyte includes an anionic polymer and a polyprotic acid.

2. The electric double layer capacitor of claim 1, wherein the anionic polymer includes a sulfonate functional group.

3. The electric double layer capacitor of claim 1, wherein the anionic polymer is formed from a vinyl aromatic monomer.

4. The electric double layer capacitor of claim 3, wherein the vinyl aromatic monomer is styrene.

5. The electric double layer capacitor of claim 1, wherein the anionic polymer includes poly(styrenesulfonic acid), a salt of poly(styrenesulfonic acid), or a mixture thereof.

6. The electric double layer capacitor of claim 1, wherein the polyprotic acid includes sulfuric acid.

7. The electric double layer capacitor of claim 1, wherein the weight ratio of polyprotic acids to anionic polymers in the electrolyte is from about 2:1 to about 40:1.

8. The electric double layer capacitor of claim 1, wherein the weight ratio of polyprotic acids to anionic polymers in the electrolyte is from about 10:1 to about 20:1.

9. The electric double layer capacitor of claim 1, wherein anionic polymers constitute from about 0.05 wt. % to about 15 wt. % of the aqueous electrolyte and polyprotic acids constitute from about 10 wt. % to about 70 wt. % of the aqueous electrolyte.

10. The electric double layer capacitor of claim 1, wherein anionic polymers constitute from about 0.5 wt. % to about 5 wt. % of the aqueous electrolyte and polyprotic acids constitute from about 25 wt. % to about 50 wt. % of the aqueous electrolyte.

11. The electric double layer capacitor of claim 1, wherein water constitutes from about 30 wt. % to about 90 wt. % of the electrolyte.

12. The electric double layer capacitor of claim 1, wherein water constitutes from about 50 wt. % to about 70 wt. % of the electrolyte.

13. The electric double layer capacitor of claim 1, wherein the electrochemically-active particles include carbonaceous particles.

14. The electric double layer capacitor of claim 1, wherein the electrodes include titanium.

15. The electric double layer capacitor of claim 1, wherein the cell further comprises a permeable separator that is positioned between the electrodes.

16. The electric double layer capacitor of claim 1, wherein the capacitor includes multiple electrochemical cells.

17. The electric double layer capacitor of claim 1, wherein the capacitor exhibits an equivalence series resistance of about 100 ohms or less, measured at an operating frequency of 120 Hz and a temperature of 70° C.

18. The electric double layer capacitor of claim 1, wherein the capacitor exhibits an equivalence series resistance of from about 0.1 to about 50 milliohms, measured at an operating frequency of 120 Hz and a temperature of 70° C.

19. The electric double layer capacitor of claim 1, wherein the capacitor exhibits a capacitance of about 1 milliFarad per square centimeter or more at a temperature of 70° C.

20. The electric double layer capacitor of claim 1, wherein the capacitor exhibits a capacitance of from about 5 to about 50 milliFarads per square centimeter at a temperature of 70° C.

21. An electric double layer capacitor comprising an electrochemical cell, the cell comprising:
   first and second electrodes each comprising a porous matrix of carbonaceous particles; and an aqueous-based liquid electrolyte disposed in contact with the carbonaceous particles, wherein the electrolyte includes sulfuric acid and an anionic polymer, wherein the anionic polymer includes poly(styrenesulfonic acid), a salt of poly(styrenesulfonic acid), or a mixture thereof.

22. The electric double layer capacitor of claim 21, wherein the weight ratio of sulfuric acid to anionic polymers in the electrolyte is from about 2:1 to about 40:1.

23. The electric double layer capacitor of claim 21, wherein the electrodes include titanium.

24. The electric double layer capacitor of claim 21, wherein the cell further comprises a permeable separator that is positioned between the electrodes.

25. The electric double layer capacitor of claim 21, wherein the capacitor includes multiple electrochemical cells.

* * * * *